FIVE-LAYER SYMMETRICAL SEMICONDUCTOR SWITCH

Filed May 14, 1965 7 Sheets-Sheet 1

Inventors:
JOHN M. S. NEILSON,
TIMOTHY J. DESMOND &
HARRY WEISBERG

BY Glenn H. Bruestle
Attorney

FIVE-LAYER SYMMETRICAL SEMICONDUCTOR SWITCH

Filed May 14, 1965 7 Sheets-Sheet 2

Inventors:
JOHN M. S. NEILSON,
TIMOTHY J. DESMOND &
HARRY WEISBERG

BY Glenn H. Bruestle
Attorney

Inventors:
JOHN M.S. NEILSON,
TIMOTHY J. DESMOND &
HARRY WEISBERG

BY Glenn H. Bruestle
Attorney

Dec. 26, 1967 J. M. S. NEILSON ET AL 3,360,696

FIVE-LAYER SYMMETRICAL SEMICONDUCTOR SWITCH

Filed May 14, 1965 7 Sheets-Sheet 4

Inventors:
JOHN M. S. NEILSON,
TIMOTHY J. DESMOND &
HARRY WEISBERG

Glenn H. Bruestle

Attorney

Dec. 26, 1967 J. M. S. NEILSON ET AL 3,360,696

FIVE-LAYER SYMMETRICAL SEMICONDUCTOR SWITCH

Filed May 14, 1965 7 Sheets-Sheet 5

Inventors:
JOHN M.S. NEILSON,
TIMOTHY J. DESMOND &
HARRY WEISBERG

BY [signature]

Attorney

Inventors:
JOHN M. S. NEILSON,
TIMOTHY J. DESMOND &
HARRY WEISBERG

Glenn H. Bamesthe

Attorney

Dec. 26, 1967 J. M. S. NEILSON ET AL 3,360,696

FIVE-LAYER SYMMETRICAL SEMICONDUCTOR SWITCH

Filed May 14, 1965 7 Sheets-Sheet 7

Inventors:
JONN M. S. NEILSON,
TIMOTHY J. DESMOND &
HARRY WEISBERG

BY Glenn H. Bruestle

Attorney 3,360,696
Patented Dec. 26, 1967

1

3,360,696
FIVE-LAYER SYMMETRICAL SEMI-CONDUCTOR SWITCH

John M. S. Neilson and Timothy J. Desmond, Mountaintop, and Harry Weisberg, Forty Fort, Pa., assignors to Radio Corporation of America, a corporation of Delaware Filed May 14, 1965, Ser. No. 455,737
10 Claims. (Cl. 317—235)

ABSTRACT OF THE DISCLOSURE

A bi-directional thyristor comprises a semiconductive body with two opposing major faces and an edge substantially perpendicular to the face. The body has five successive regions of alternately different type conductivity, four p-n junctions between the five regions, and three electrodes. Only two of the p-n junctions intercept the edge.

This invention relates to improved semiconductor devices, and more particularly, to improved three-terminal semiconductor devices which can be triggered to switch from the non-conducting state to the conducting state by the application of a signal current between the device terminals, and which can be blocking or conducting in either direction.

One type of semiconductor device is made of a semiconductive body with four zones or layers of alternately different conductivity types in a PNPN configuration; three rectifying barriers or PN junctions between the four zones; and electrodes attached to three of the four zones. One device electrode is attached to the outer N type region, and may be called the device cathode; another device electrode is attached to the outer P type region, and may be termed the device anode; and the third device electrode, which may be denominated the gate or control electrode, is attached to the inner P type region adjacent the cathode. Devices of this type are known as controlled rectifiers, or as thyristors, and, by the application of a low voltage, low current pulse between the gate and the cathode, can be switched from non-conducting to conducting between the anode and the cathode in one direction only, i.e., that direction in which the anode is poled positive and the cathode poled negative.

In order to provide devices which can be switched, by a signal current of either polarity, from non-conducting to conducting in either direction, more complex units have been made comprising a semiconductive body or wafer with five zones or regions of alternately different conductivity types in an NPNPN configuration. These devices, which may be termed bidirectional thyristors, have four rectifying barriers or PN junctions between the five zones, and three electrodes or terminals. See for example Gentry et al. "Bidirectional Triode P-N-P-N Switches," Proc. IEEE, April 1965, pp. 355–369. Although devices of this type have been fabricated, improvement is desirable in several respects. For example, one region of the bidirectional thyristor serves as a resistor to govern the trigger current which is applied to the gate or control electrode. In prior art bidirectional thyristors, this resistance region is so located that after it is formed in the semiconductive body of the device, its electrical resistance value (termed the shunt resistance) may be affected by subsequent processing steps such as exposure to etchants or to ambient atmospheres. Moreover, in prior art bidirectional thyristors, four or more of the different conductivity type regions of the device are exposed at the edges of the semiconductive body, making the device unduly sensitive to surface leakage currents. Furthermore, in prior art bidirectional thyristors the relatively large semiconductive body which is employed is not efficiently utilized. In addition, in prior art units the gate current required to switch the device is higher in some modes of operation than in other modes, although it is desirable for ease in circuit design that the gate current required for switching be substantially identical in all modes of operation.

2

Accordingly, it is an object of this invention to provide improved semiconductor switching devices.

Another object is to provide improved bidirectional thyristors.

Still another object is to provide improved bidirectional thyristors with stable and uniform shunt resistance values.

But another object is to provide improved bidirectional thyristors which are less susceptible to surface leakage currents.

Still another object is to provide improved bidirectional thyristors which efficiently utilize the bulk of the semiconductive body employed.

Yet another object is to provide improved bidirectional thyristors in which the gate current required for switching is substantially identical in all modes of operation.

The invention and its features will be described by the following examples, considered in conjunction with the accompanying drawing, in which.

Figure 5:
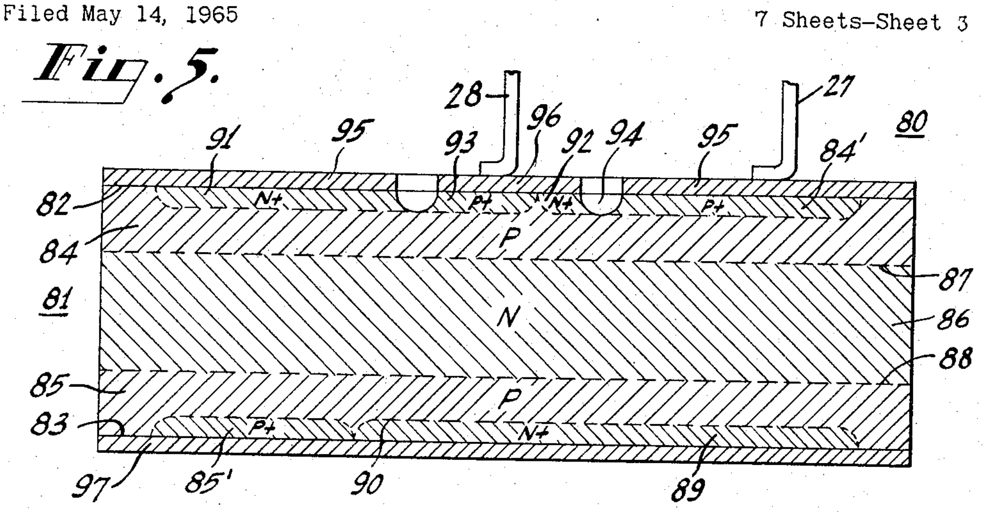
FIGURE 5 is a cross-sectional view of a semiconductor device according to a fifth embodiment.
Figure 6A:
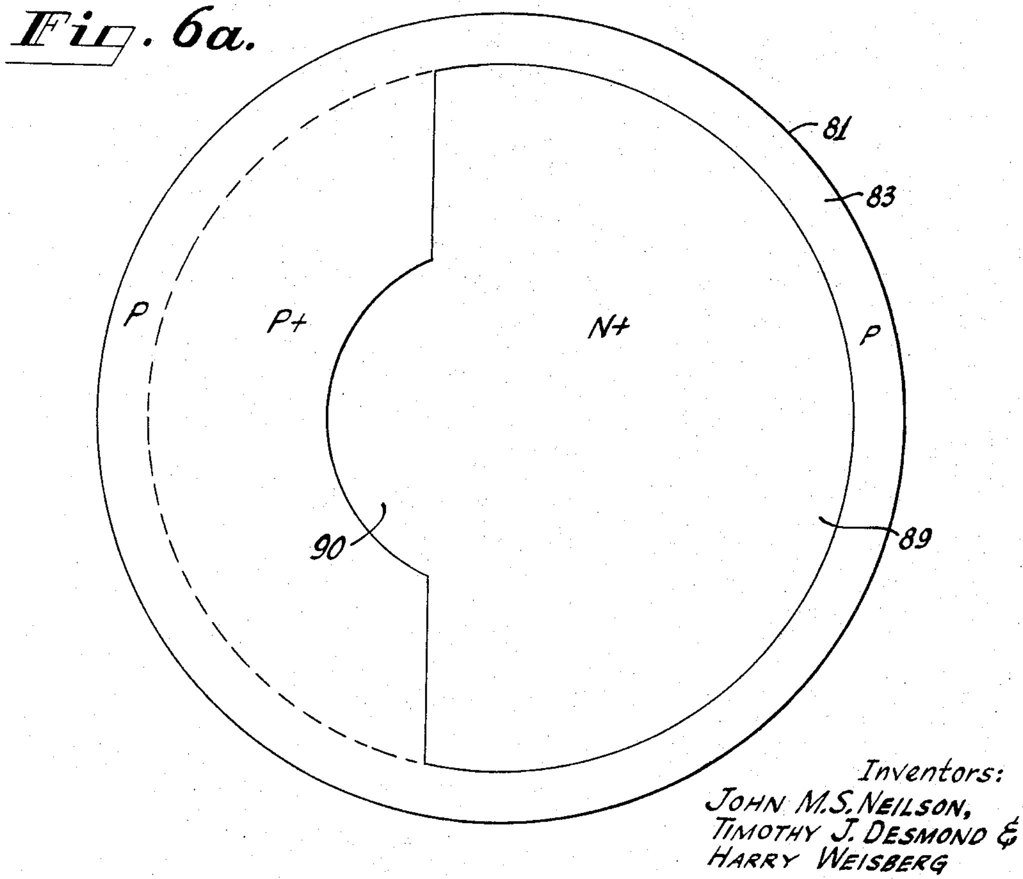
Figure 6B:
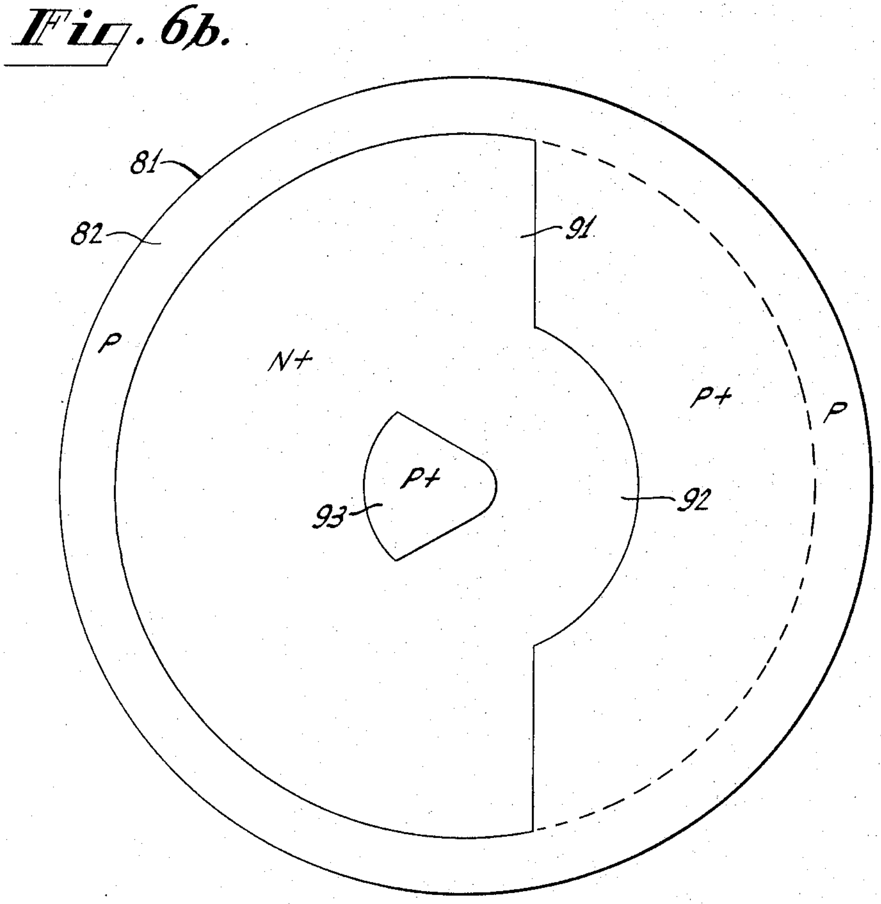
Figure 6C:
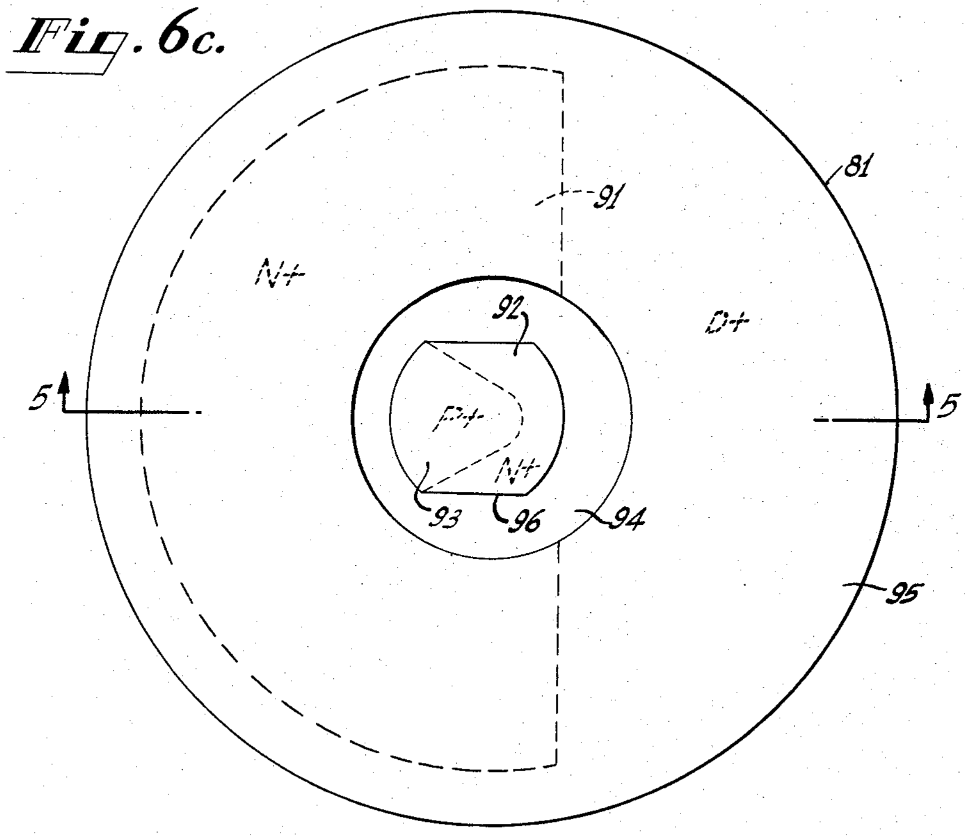
Figure 9:
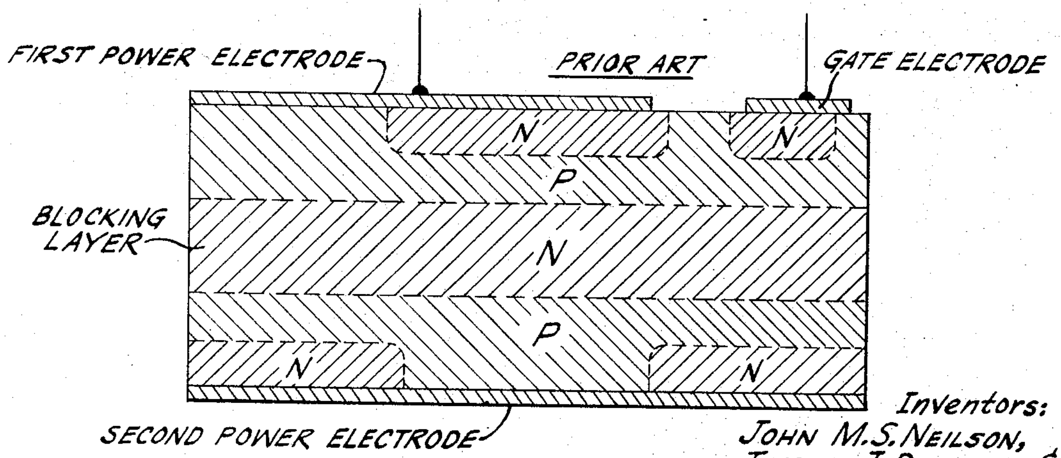
Figure 8:
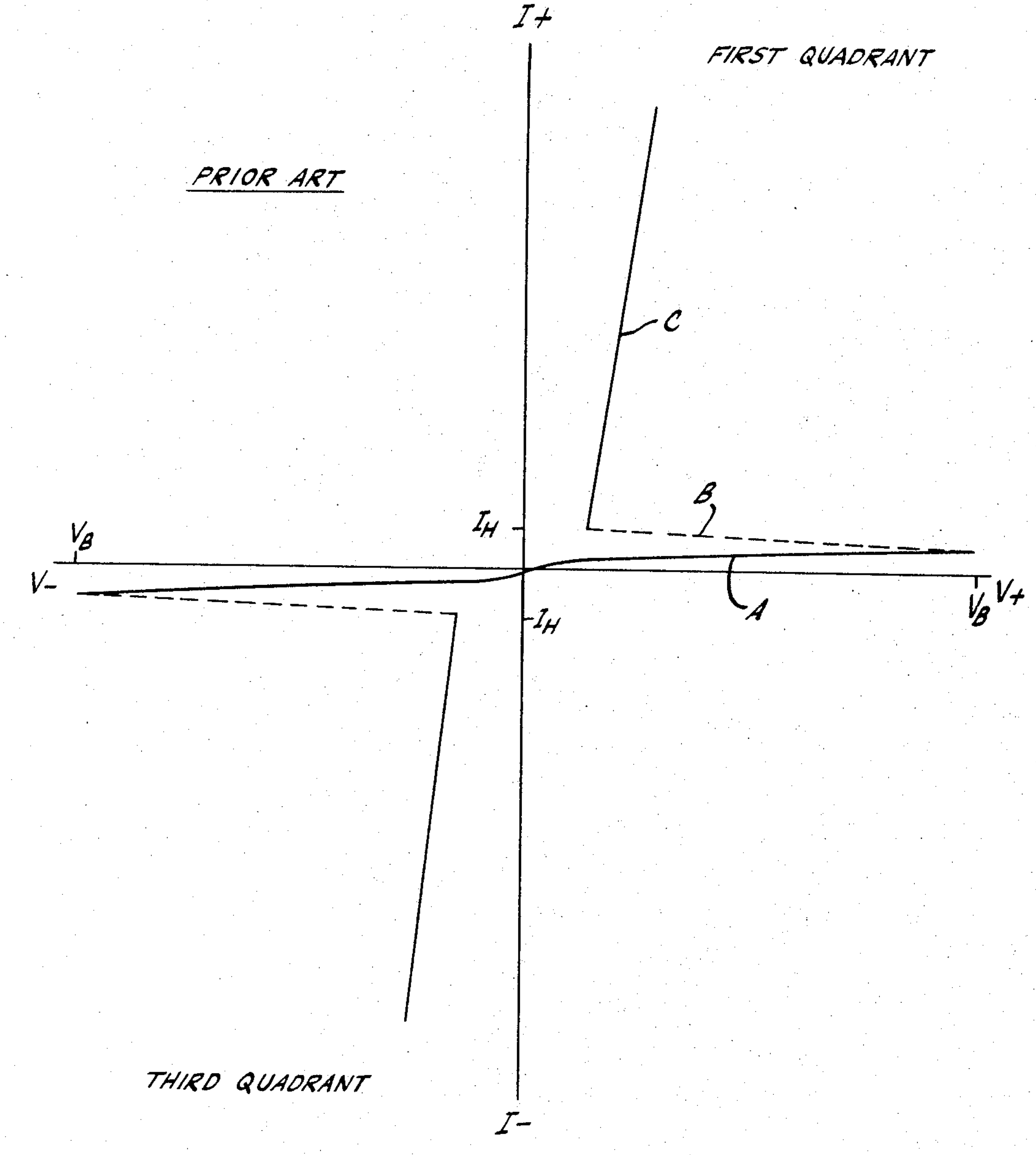

FIGURES 6*a* and 6*b* are plan views of the lower and upper faces respectively of the device of FIGURE 5 at one stage in the fabrication of the device;

FIGURE 6*c* is a plan view of the upper face of the device of FIGURE 5 at a later stage in the fabrication of the device;

FIGURES 7*a*–7*d* are schematic views of an NPN transistor, a PNP transistor, a thyristor, and a bidirectional thyristor respectively according to the prior art;

FIGURE 8 is a plot of output current against voltage for a bidirectional thyristor; and, FIGURE 9 is a cross-sectional view of a prior art bidirectional thyristor.

The relation of prior art bidirectional thyristors to prior art transistors and prior art unidirectional thyristors, such as controlled rectifiers, is shown in FIGURES 7*a*–7*d*.

A conventional NPN transistor (FIGURE 7*a*) has an N type emitter region adjacent one end or surface of the device; an N type collector region adjacent the opposite end or surface of the device; and a central P type base region. Emitter, base, and collector electrodes are generally metallic masses attached to the emitter, base and collector regions. The emittter, base and collector leads are electrical lead wires attached to the emitter, base and collector electrodes respectively.

A conventional PNP transistor (FIGURE 7*b*) has the conductivity types of the various device regions reversed, so that the emitter and collector regions of the PNP transistor are P type, while the base region between them is N type.

The device known as the controlled rectifier or thyristor (FIGURE 7*c*) is, as mentioned above, a single semiconductive body with four different conductivity type zones and three PN junctions between the four zones. However, the functioning of the thyristor may be better understood by considering it as a combination of two transistors, consisting of an NPN transistor connected with a PNP transistor so that the P type base of the NPN unit is connected to, or in common with, the P type emitter of the PNP transistor, while the N type collector or the NPN transistor is connected to, or in common with, the N type base of the PNP transistor. This common N type portion, which is a single zone or region in an actual device, does not have an electrode attached to it, and is known as the blocking layer of the device. The characteristic switching action of the device takes place when the sum of the alpha (current transfer ratio) of the NPN transistor and the alpha of the PNP transistor exceeds unity. The device then becomes conductive in the forward direction only, that is, the direction in which the electrons flow from the N type region labeled "cathode region" to the P type region labeled "anode region," while the current flow is in the opposite direction. The electrical characteristics of a thyristor are in some respect similar to that of a thyratron, from which the name is derived. For a discussion of the thyratron action of a class of semiconductor devices called thyristors, see C. W. Mueller and J. Hilibrand, "The Thyristors—A New Highspeed Switching Transistor," IRE Transactions on Electron Devices, January 1958.

The bidirectional thyristor (FIGURE 7*d*) is a single semiconductive body with five different conductivity type zones and four PN junctions between the five zones. When considering how it functions, it may be regarded as a combination of NPNP thyristor with a PNPN thyristor, the combination being made so that thre zones of the first thyristor are in electrical connection (or in common) with three zones of the second thyristor. The one zone of the device which does not have any electrode attached is known as the blocking layer.

Figures 7A, 7B, 7C, 7D:
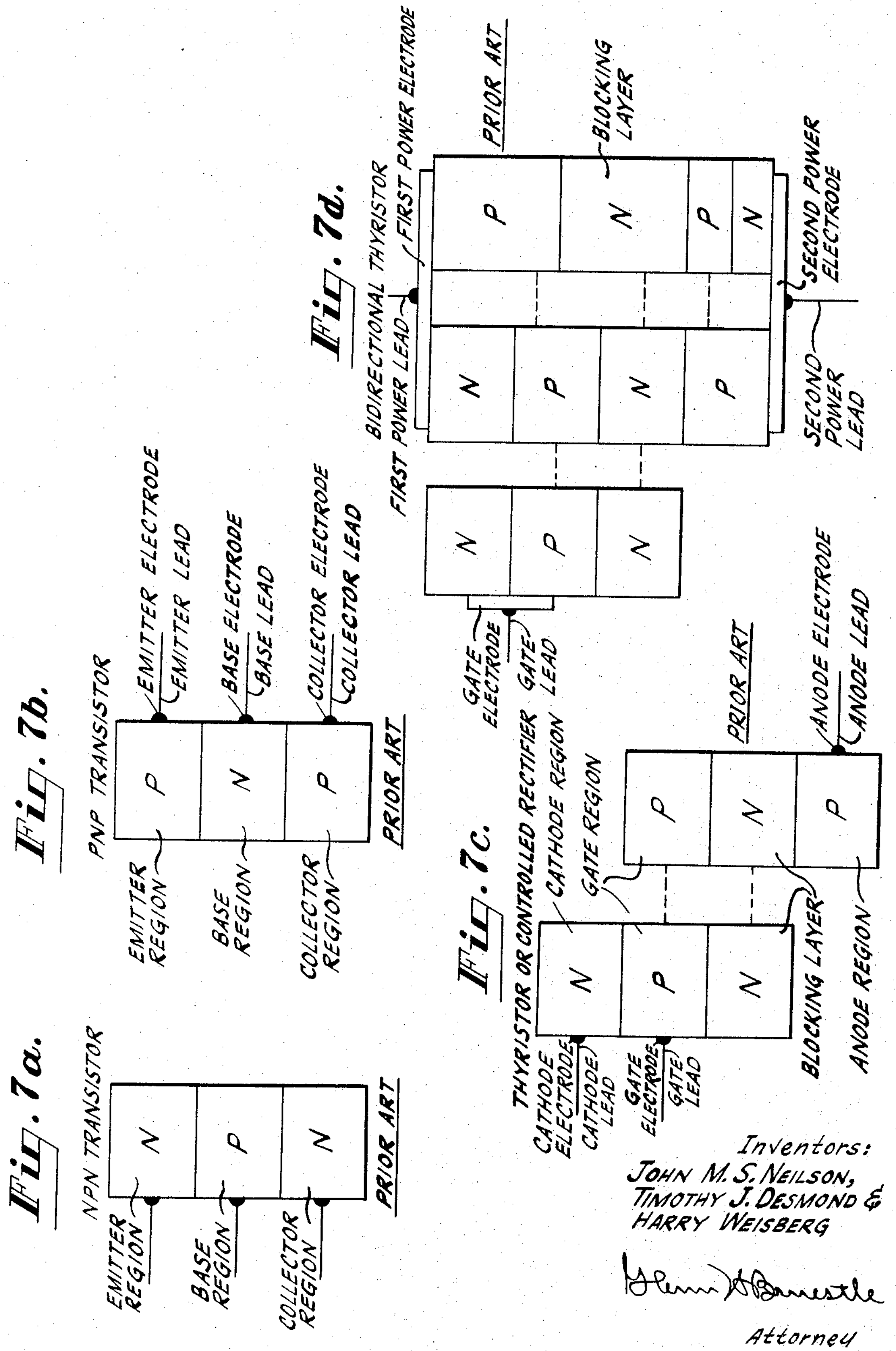

In the devices of FIGURES 7*a*–7*c*, each device electrode is a metallic mass in contact with a single region of one conductivity type. In contrast, in the bidirectional thyristor (FIGURE 7*d*) each device electrode is a metallic mass in contact with two adjoining zones or regions of opposite conductivity type, and hence may be termed a bipolar electrode.

The electrical characteristics of a bidirectional thyristor are illustrated by the current vs. voltage (I-V) curve in FIGURE 8. Consider the portion of the curve in the upper right hand, or first, quadrant. At zero gate bias, the application of a voltage across the power electrodes of the device results in a very slow increase in output current, as indicated by the shallow positive slope of the curve legended A. In this A portion of the curve, the device is in the non-conducting state. When the applied voltage reaches a particular value known as the breakover voltage $V_B$, there is a transient negative resistance region in the I-V curve, which is shown as a dashed line legended B. The device then becomes conducting, and the output current increases sharply with applied voltage, as shown by the steep positive slope of portion C of the curve. The output current when the device becomes conductive is known as the holding current $I_H$. The device will remain in the conductive state as long as the output current is greater than the holding current, but will switch to the non-conducting state if the output current drops below the value of the holding current. The portion of the curve in the lower left hand, or third, quadrant is generally symmetrical with respect to the portion in the first quadrant, the polarity of the applied voltage and the polarity of the output current and the slopes of the comparable portions of the I-V curve being reversed. In both quadrants, the application of a low voltage low current pulse of either polarity between the gate electrode and the first power electrode switches the device from the non-conducting state to the conducting state in either direction.

The structure of a prior art bidirectional thyristor is illustrated in FIGURE 9. Four different conductivity zones or regions of the device, together with three different rectifying barriers between the four regions, are exposed at the edges of the semiconductive body, thereby undesirably increasing the surface leakage currents of the unit. Moreover, the shunt resistance values of these prior art devices are not as stable with time or as uniform from device to device as is desirable.

*Example I*

A semiconductive device 10 (FIGURE 1) according to a first embodiment of the invention comprises a crystalline semiconductive body 11 having two opposing major faces 12 and 13, two zones 14 and 15 of given conductivity type immediately adjacent major faces 12 and 13 respectively, and a zone 16 of opposite conductivity type intermediate said two given type zones. The precise size, shape, composition and conductivity of semiconductive body 11 are not critical. Conveniently, semiconductive body 11 consists of N type monocrystalline silicon, has a resistivity of about 8 ohm-cm., and is in the form of a disc about 130 mils in diameter, and about 8 mils thick. The two P type zones or regions 14 and 15 are formed in wafer 11 adjacent major faces 12 and 13 respectively by standard methods of the art, for example by diffusing an acceptor such as a boron compound, e.g., boric oxide, into the major wafer faces 12 and 13. Zones 14 and 15 are conveniently each about 2.0 mils thick.

Advantageously, a thin portion of each P type zone immediately adjacent each major wafer face is more heavily doped than the remainder of said P type zone, and hence has a low resistivity. Hereinafter, heavily doped low resistivity P type regions are designated $P^+$ regions, and heavily doped low resistivity N type regions are designated as $N^+$ regions. Such heavily doped low resistivity surface portions of the two wafer zones are readily formed by an additional diffusion step. In this example, one such heavily doped low resistivity $P^+$ type portion 14' of P type zone 14 is formed as an annular region immediately adjacent wafer face 12, and close to, but spaced from, the periphery of wafer face 12. Conveniently, the $P^+$ region 14' is about 0.8 mil thick, has an outer diameter of about 110 mils, and has an inner diameter of about 80 mils. At the same time, an annular $P^+$ region 15' is formed in zone 15 immediately adjacent wafer face 13. The $P^+$ region 15' is also about 0.8 mil thick; has an outer diameter of about 80 mils; and has an inner diameter of about 40 mils. Suitably, the outer diameter of $P^+$ region or portion 15' is about equal to the inner diameter of the $P^+$ reigon 14'. The $P^+$ portions 14' and 15' do not extend to the wafer edges, and are exposed only at the major wafer faces.

Devices according to the invention may be fabricated without the $P^+$ portions 14' and 15' in the P type zones, but their presence improves the electrical characteristics of the device.

The remaining or central portion 16 of wafer 11 consists of the original N type silicon of the wafer. A rectifying barrier 17 is formed at the boundary between P type zone 14 and the central N type portion or zone 16. Another rectifying barrier 18 is formed at the boundary between the P type zone 15 and the central N type zone 16.

Heavily doped given conductivity type regions of low resistivity are now formed in the opposite type surface zones 14 and 15 by standard techniques. In one method predetermined portions of major faces 12 and 13 are masked, for example by standard photolithographic techniques of the art. The silicon wafer 11 is then heated in the vapors of a substance such as phosphorus pentoxide, which is a donor in the semiconductive body 11. A plurality of phosphorus-doped N+ type regions are thus formed in the boron-doped P type zones 14 and 15 immediately adjacent wafer faces 12 and 13 respectively. A first N+ type diffused region 19 thus formed is in the central portion of P type zone 15 immediately adjacent wafer face 13. A second N+ type diffused region 20 immediately adjacent wafer face 13 is formed in P type zone 15 around the periphery of region 19 but spaced therefrom, and is annular in shape. The N+ region 20 may be disposed just outwardly of the P+ region 15'. Third and fourth diffused N+ type regions 22 and 23 which are also annular in shape are formed in P type zone 14 immediately adjacent wafer face 12. The thickness of all these diffused regions is less than the thickness of P type zones 14 and 15 and is conveniently about 0.8 mil.

The N+ type regions 22 and 23 in zone 14 are conveniently fabricated by first forming a single wide annular N+ type region in zone 14. Conventional masking and etching methods of the art, such as photolithographic techniques, are employed to form an annular groove or moat 21 into the aforesaid N+ diffused region in face 12 of wafer 11. The depth of moat 21 is made less than the thickness of the P type zone 14, but greater than the thickness of the N+ diffused region in zone 14, and hence is deep enough to divide the N+ diffused region adjacent wafer face 12 into two annular or ring-shaped regions; a smaller region 22 near the center of wafer 11, and a larger region 23 which is around the outer periphery of region 22, but spaced therefrom by the moat 21. The moat 21 is immediately adjacent the outer periphery of region 22 and the inner periphery of region 23. In this example, moat 21 is about 5 mils wide and about 0.9 mil deep.

Next, conductive electrodes are formed on the device. A mass or layer of a conductive metal or alloy is deposited by any convenient method, such as by evaporation or plating, on selected portions of major wafer faces 12 and 13. One such metallic mass 24 on the central portion of wafer face 12 extends to the outer periphery of the annular N+ type region 22 and the inner periphery of moat 21. The metallic mass 24 serves as the gate electrode, and is in direct contact with both a P type wafer region (the center of P type zone 14) and an N type wafer region (the annular region 22).

Another metallic mass 25 is deposited as an annulus on wafer face 12 between the outer periphery of moat 21 and the periphery of wafer face 12. The metallic mass 25 serves as the first power electrode of the device, and is in direct contact with both the annular N type region 23 and P+ region 14' and the peripheral portion of the P type zone 14.

A third metallic mass or electrode 26 covers wafer face 13. The metallic mass or layer 26 is the second power electrode of the device, and is in direct contact with the P type zone 15, as well as with the N+ type diffused regions 19 and 20 and P+ region 15'.

To complete the device, an electrical lead wire 27 is attached to the first power electrode 25 by any convenient method, such as thermocompression or ultrasonic bonding. Another electrical lead wire 28 is similarly attached to the gate electrode 24. The subsequent steps of mounting the device with the power electrode 26 down on a metallic header, and encapsulating and casing the device, are accomplished by standard methods of the art, and need not be described here.

When the device of this example is operating in the first quadrant of the I-V graph (FIGURE 8), the N+ type region 23 injects electrons toward the blocking layer 16, and is known as the first quadrant N emitter, while that portion of P type zone 15 which is between the N+ type regions 19 and 20 injects holes toward the blocking layer 16, and is known as the first quadrant P emitter. When the device is operating in the third quadrant, the N+ type region 20 injects electrons toward the blocking layer 16, and is known as the third quadrant N emitter, while that portion of P type zone 14 which is between N+ type region

23 and the outer periphery of zone 14 injects holes toward the blocking layer 16, and is known as the third quadrant P emitter.

In the operation of the device with a positive gate bias, the wafer region indicated by the bracket 29, which consists of the portion of P type zone 14 under the annular N type region 23, serves as the shunt resistance. When the device is operated with a negative gate bias, the wafer region indicated by the bracket 29', which consists of the portion of P type zone 14 under the annular N+ type region 22, serves as the shunt resistance.

The physical significance of the shunt resistance region of the water is presently explained as this: when the IR drop across this region reaches a particular value, the emission of electrons from one of the N+ emitters into the blocking layer switches the device to the "ON" or conductive state. Since the shunt resistance thus determines the value of gate current at which switching of the device occurs, it is important that the shunt resistance be stable with time, and be uniform from device to device.

A feature of the device is that the shunt resistance regions therein are not affected by subsequent processing steps, such as exposure to etchants. Improved stability and uniformity of electrical parameters are thus obtained.

Another feature of the device is that only three different conductivity type zones or regions are exposed at the edges of the semiconductive wafer or body. The exposed zones at the wafer edges consist of a central zone of given conductivity type, and two opposite conductivity type zones adjoining the two opposing major faces respectively of the wafer. As a result of this structure, the surface leakage currents which tend to degrade device performance are minimized. Comparable prior art devices have four or more different conductivity type regions exposed at the edges of the semiconductive body, and hence have more surface leakage currents than the device described herein.

The devices of this example can be switched or triggered from the non-conducting state to the conducting state by the application of a low current, low voltage pulse of either polarity applied between the first power electrode and the gate or control electrode. The triggering voltage required for this purpose may be as little as two to three volts. In the devices of the following examples, the triggering voltage required is even less, being reduced to about 0.8 to 1.5 volts.

*Example II*

The bidirectional thyristor 30 (FIGURE 2) of this example comprises a monocrystalline semiconductive body or wafer 31 having two opposing major faces 32 and 33. The precise size, shape and composition of semiconductive body 31 are not critical. The semiconductive body 31 may be disc-shaped, as in the previous example, and may consist of N type silicon-germanium alloy. Two P type zones or regions 34 and 35 are formed in body 31 immediately adjacent major faces 32 and 33 respectively. Zones 34 and 35 may be formed by diffusion techniques as in Example I, or by epitaxial growth of P type semiconductive layers on an N type semiconductive substrate, utilizing one of the procedures described in RCA Review, December 1963. An annular surface portion 34' of zone 34 is made P+ type, and an annular surface portion 35' of zone 35 is also made P+ type. Conveniently portions 34' and 35' are simultaneously made P+ by an additional diffusion step. The central portion or zone 36 of wafer 31 which is intermediate zones 34 and 35, consists of the original N type semiconductor. Rectifying barriers 37 and 38 are formed at the boundaries between P type zones 34 and 35 respectively and the central N type zone 36.

Predetermined portions of major wafer faces 32 and 33 are masked, for example by a photoresist, and the masked wafer is then treated in the vapors of a suitable donor to form a plurality of N+ type regions in the P type zones 34 and 35. A first annular N+ type region 39 is formed close to the center of P type zone 35, and immediately adjacent wafer face 33. A second annular N+ type region 40 is formed in P type zone 35 immediately adjacent wafer face 33 and around the outer periphery of region 39 but spaced therefrom. Region 40 is made narrower than region 39. A third diffused N+ region 41 is formed in the P type zone 34 immediately adjacent wafer face 32, and in the central portion thereof. A fourth diffused N+ type region 42 is formed in P type zone 34 around the outer periphery of region 41 but spaced therefrom, and is annular in shape. As in Example I, the diffused N+ regions 39–42 are thinner than P type zones 34 and 35. Conveniently the width of the various diffused regions is selected so that the inner periphery of annular region 39 is beneath the outer periphery of region 41; the outer periphery of region 39 is beneath the inner periphery of region 42; and the inner periphery of region 40 is beneath the outer periphery of region 42.

Standard photolithographic masking and etching methods of the art are employed to cut a first annular moat or trough 43 into a wafer face 32 immediately adjacent the periphery of N+ type region 41, and a second annular moat or trough 44 in wafer face 32 immediately adjacent the outer periphery of region 42. The depth of moats 43 and 44 is made less than the thickness of P type zone 34, but more than the thickness of the diffused regions 39–42. The exact width of moats 43 and 44 is not critical, and may for example be about 5 mils in this example.

A mass or layer of a conductive metal or alloy is deposited by evaporation on selected areas of major wafer faces 32 and 33. One such metallic mass 45 on the central portion of wafer face 32 is over the central N+ type region 41 within the moat 43. A second metallic mass 46 on wafer face 32 is annular in shape, and extends from close to the outer periphery of moat 43 to close to the inner periphery of moat 44. The metallic mass 46, which serves as the first power electrode of the device, is thus in direct contact with P type zone 34 and N+ type region 42. A third metallic mass 47 on wafer face 32 is annular in shape, and extends from close to the outer periphery of moat 44 to close to the outer periphery of wafer face 32.

Another metallic mass or layer 26 is deposited on wafer face 33. The metallic mass 26 is the second power electrode of the device, and is in direct contact with the P type layer 35 and P+ region 35', as well as with the N+ type regions 39 and 40. The metallic electrodes 45–47 and 26 may, for example, be deposited by evaporation, and may consist of aluminum or gold.

To complete the device, an electrical lead wire 27 is attached to the first power electrode 46 by any convenient method. Another electrical lead wire 48 is attached by means of a U-shaped terminal portion to both the central electrode 45 and the peripheral electrode 47 on wafer face 32. The subsequent steps of mounting the device with power electrode 26 down on a metallic header, and casing the device, are accomplished by standard methods of the art, and need not be described here.

In the operation of the device, the region 49, which consists of the portion of P type zone 34 under the annular N+ type region 42, serves as the shunt resistance region for either gate bias. The value of the shunt resistance is stable, and is not affected by the processing of the semiconductive wafer 31 after the various regions are formed. Moreover, only three different device regions (zones 34, 35 and 36) and only the two rectifying barriers or PN junctions between said three regions, are exposed at the edges of the semiconductive wafer 31, thus minimizing surface leakage currents.

The power electrodes 26 and 46 of this example are clearly bipolar electrodes, since each is in direct contact with P type and N type portions of the semiconductive wafer 31. Electrode 45 is in direct contact with only the N+ type region 41, and electrode 47 is in direct contact with only the P type zone 34, but since electrodes 45 and 47 are connected by the single gate or control lead 48, the gate lead 48 is effectively bipolar.

*Example III*

The device 50 (FIGURE 3) of this example is in some respects similar to that of Example I, and comprises a disc-shaped monocrystalline semiconductive body or wafer 11 having two major faces 12 and 13. The semonconductive wafer 11 has two P type zones 14 and 15 immediately adjacent wafer faces 12 and 13 respectively; two annular P+ portions 14' and 15' in zones 14 and 15 respectively immediately adjacent wafer face 12 and 13 respectively; and a central N type zone 16 between zones 14 and 15. Two p-n junctions 17 and 18 are formed at the boundaries betwen the central N type zone 16 and the two P type zones 14 and 15 respectively.

Standard masking and diffusing techniques are employed to form a plurality of N+ type regions in P type zones 14 and 15. A first N+ type region 19 is formed in the central portion of P type zone 15 immediately adjacent wafer face 13. A second N+ type region 20 is formed in P type zone 15 near the periphery thereof, and is annular in shape. Region 20 is around the periphery of region 15, but spaced therefrom. A third N+ type region 51 is formed in P type zone 14 adjacent wafer face 12 near the center thereof. A fourth N+ type region 52 is formed in zone 14 near the periphery thereof. Regions 51 and 52 are both annular in shape, but region 51 is wider than region 52. Photolithographic masking and etching techniques are employed to form in wafer face 12 a first annular moat 53 around and immediately adjacent the inner periphery of annular region 51, and a second annular moat 54 around and immediately adjacent the inner periphery of N type annular region 52. Moat 54 is spaced from the outer periphery of region 51. As in the previous examples, the depth of the moats (53 and 54) is a little greater than the thickness of the diffused regions (51 and 52), but less than the thickness of the P type zone 14.

A mass or layer of a conductive metal such as aluminum or the like is deposited on selected portions of wafer faces 12 and 13. A first metallic mass or layer 26 covers major face 13, and is in direct contact with P type zone 15 and P+ region 15', as well as N+ type regions 19 and 20. A second metallic mass or layer 55 covers a small central portion of wafer face 12 within the moat 53, and is in direct contact with P type zone 14. A third metallic mass 56 which serves as the first power electrode is in the form of an annulus or ring on wafer face 12 between moats 53 and 54, and around the periphery of metallic layer 55, but spaced therefrom by the moat 53. A fourth metallic mass 57 is in the form of an annulus or ring on wafer face 12 around the outer periphery of electrode 56, but spaced therefrom by the moat 54.

To complete the device, an electrical lead wire 27 is attached to the first power electrode 56 by any convenient method. Another electrical lead wire 58 is attached by means of a U-shaped terminal portion to both the central electrode 55 and the peripheral electrode 57 on wafer face 12, and serves as the gate lead. The subsequent steps of mounting the device with power electrode 26 down on a metallic header, and casing the device, are accomplished by standard methods of the art.

In the device 50 of this example, the shunt resistance is the resistance of the portion 59 of zone 14 beneath the N+ diffused region 51. As in the previous embodiments, the shunt resistance value is stable, and is not affected by the processing of the semiconductive wafer 11. Moreover only three different device regions are exposed at the edges of the semiconductive wafer 11, thus minimizing surface leakage currents.

*Example IV*

In the previous examples, the semiconductive body employed was disc-shaped. The precise shape of the semiconductive body is not critical, and may, for example, be a parallelepiped, as in this example.

Figure 4:
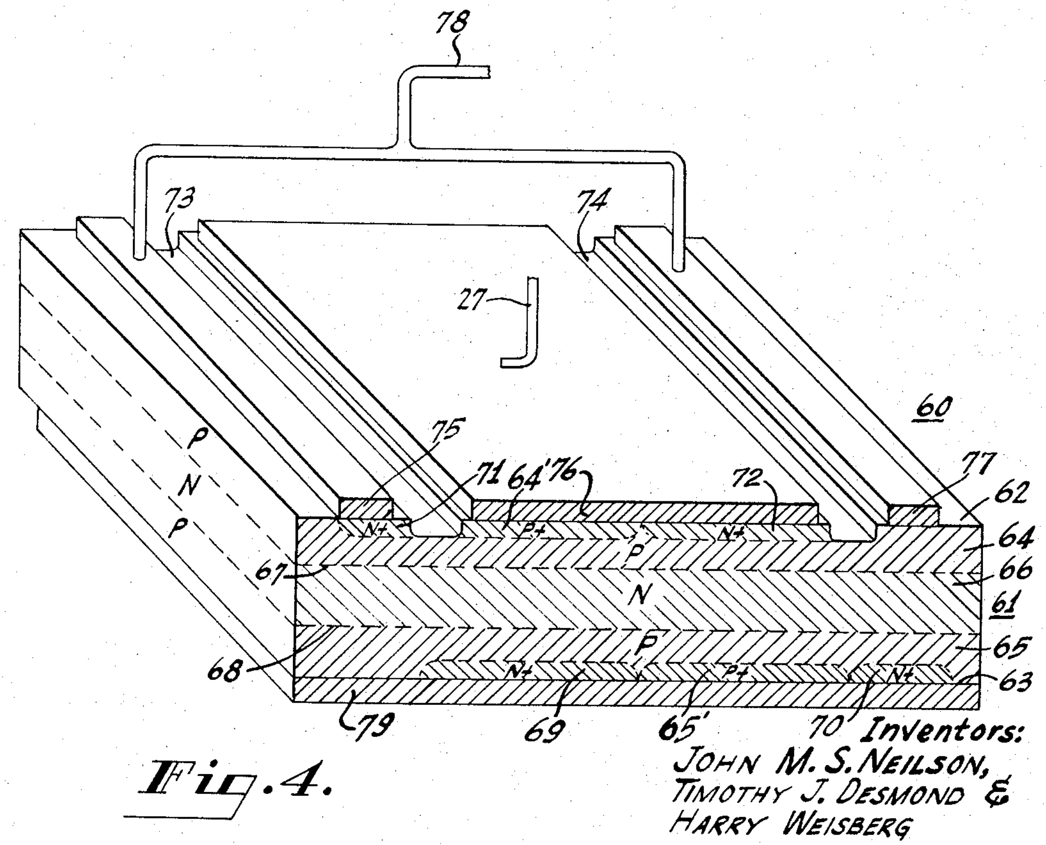
FIGURE 4 is a fragmentary, partly cross-sectional view of a semiconductor device according to a fourth embodiment.

The bidirectional thyristor 60 (FIGURE 4) of this example comprises a given conductivity type semiconductive wafer 61 having two opposing major faces 62 and 63, and two opposite conductivity type zones 64 and 65 adjacent wafer faces 62 and 63 respectively. In this example, semiconductive wafer 61 is about 110 mils long, 70 mils wide, and 9 mils thick. Wafer 61 may consist of a crystalline elemental semiconductor such as germanium or silicon, or a crystalline compound semiconductor such as gallium arsenide.

Wafer 61 may be either conductivity type. For convenience in comparing wafer 61 with the devices of previous examples, it will be described in terms of an N type body having a layered structure, with two P type zones 64 and 65 immediately adjacent wafer faces 62 and 63 respectively. Two P+ regions 64' and 65' are formed in zones 64 and 65 respectively immediately adjacent wafer faces 62 and 63 respectively. Zones 64 and 65 are separated by a central N type zone 66, which is the original N type body of wafer 61. Two rectifying barriers or PN junctions 67 and 68 are formed at the boundaries between N type central zone 66 and the two P type surface zones 64 and 65 respectively.

Four N+ type regions 69, 70, 71 and 72 are formed by masking portions of wafer faces 62 and 63, and diffusing a suitable donor into the unmasked portions thereof. When the wafer consists of gallium arsenide the donor may be sulfur, selenium, or tellurium. The time and temperature of the diffusion step is controlled so that the thickness of each of the four diffused regions is less than the thickness of P type zones 64 and 65. The precise size and shape of the diffused regions 69–72 are not critical. Regions 69 and 70 in zone 65 may for example be rectangular, with the long axis of each region running parallel to the length or long axis of semiconductive body 61. Thus region 69 is adjacent and parallel to the first wafer side, but spaced therefrom, while region 70 is adjacent and parallel to the second wafer side, but spaced therefrom. One diffused region 69 is made wider than the other diffused region 70. In zone 64 two diffused regions 71 and 72 are formed immediately adjacent wafer face 62. The thickness of the diffused regions 71 and 72, which are N+ type in this example, is less than the thickness of P type zone 64. The shape of regions 71 and 72 may also be rectangular, with the long axis of each region parallel to the long axis of semiconductor body 61. Thus region 71 is adjacent and parallel to the first wafer side but spaced therefrom, while region 72 is adjacent and parallel to the second wafer side but spaced therefrom. Preferably, the diffused regions 71 and 72 do not emerge at either the end or the side surfaces of the wafer 61, and one diffused region 72 is wider than the other diffused region 71. The length of diffused regions 69 and 70 is made less than the length of the wafer, so that these regions do not intercept either the ends or the sides of semiconductive wafer 61. Conveniently the outer edge of region 69 is beneath the inner edge of region 71; the inner edge of region 69 is beneath the inner edge of region 72; and the inner edge of region 70 is beneath the outer edge of region 72.

Standard masking and etching techniques are used to cut two moats or troughs 73 and 74 in wafer face 62. Suitably, moats 73 and 74 are each about 5 mils wide, and extend along the entire length of semiconductive wafer 61. The depth of moats 73 and 74 is a little more than the thickness of the diffused regions 71 and 72, but less than the thickness of P type zone 64. Moat 73 is immediately adjacent the inner edge of the diffused region 71, and lies between region 71 and the center of semiconductive body 61. Moat 74 is immediately adjacent the outer edge of diffused region 72, i.e., moat 74 is on the side of region 72 which is remote from region 71.

Masses of a conductive metal or alloy are deposited as a layer on selected portions of wafer faces 62 and 63 to form the device electrodes. One device electrode 75 is deposited on wafer face 62 so as to cover only the diffused region 71. Another device electrode 76 is deposited on wafer face 62 so as to cover only the portion of said face between moats 73 and 74. Another device electrode 77 is a metallic layer deposited on wafer face 62 so as to cover only the portion of said face between moat 74 and the adjacent edge of the semiconductive wafer 61. As in Examples II–IV, the two electrodes which are attached to regions of only one conductivity type, i.e., electrodes 75 and 77 in this embodiment, are connected by means of an electrical lead wire 78 which has a U-shaped terminal portion, one leg of the U being attached to electrode 75 and the other leg to electrode 77. An electrical lead wire 27 is attached to electrode 76, which serves as the first power electrode of the device. A metallic layer or mass 79 covering major wafer face 63 serves as the second power electrode of the unit.

Figure 1:
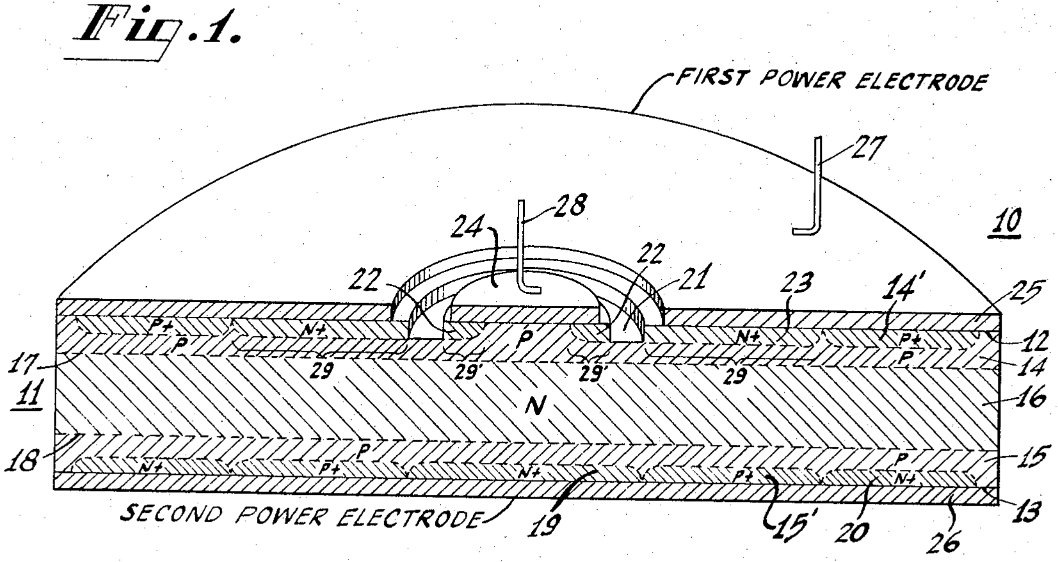
FIGURE 1 is a fragmentary, partly cross-sectional view of a semiconductor device according to a first embodiment of the invention.
Figure 2:
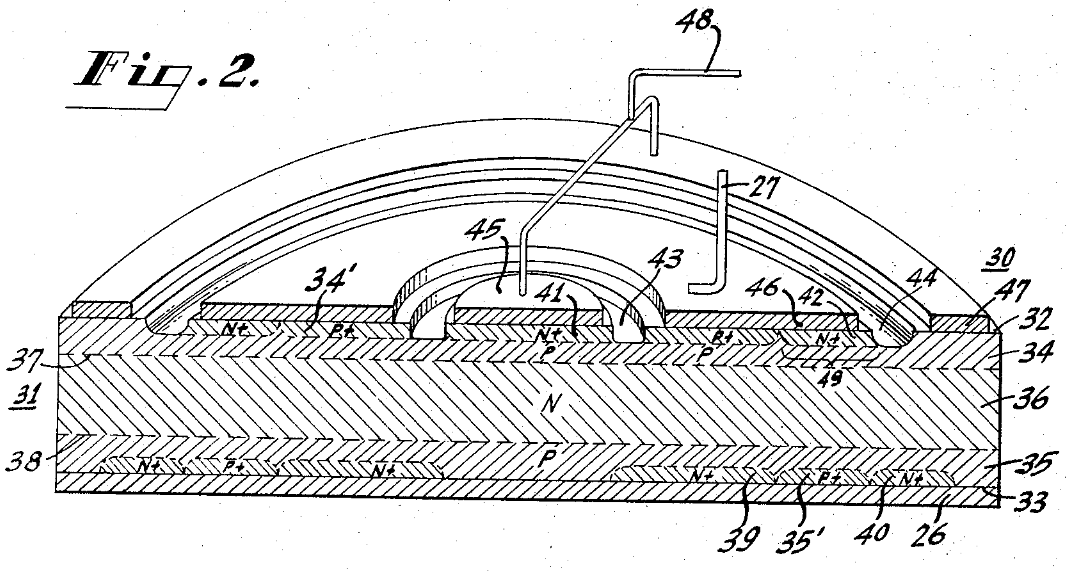
FIGURE 2 is a fragmentary, partly cross-sectional view of a semiconductor device according to a second embodiment.
Figure 3:
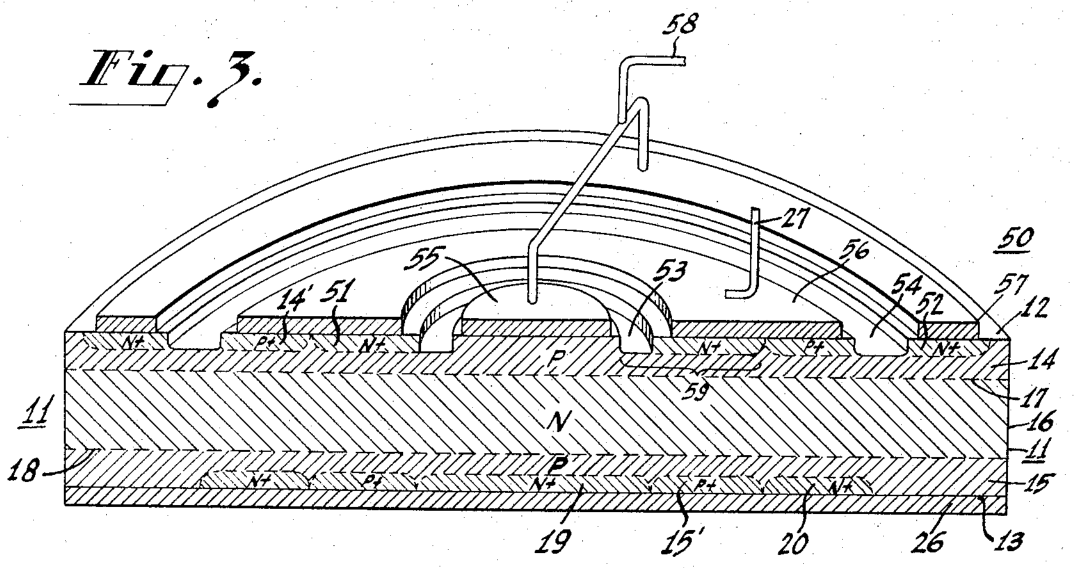
FIGURE 3 is a fragmentary, partly cross-sectional view of a semiconductor device according to a third embodiment.

The device of this embodiment has several of the features previously mentioned in connection with the devices of FIGURES 1–3. The shunt resistance region of the device, which is the portion of P type zone 64 beneath N+ diffused region 72, is not affected by the processing steps, since very little of this region is exposed to the action of ambients and etchants. Moreover, the surface leakage currents are reduced, since only three different adjacent zones or regions of the device (and only the two PN junctions between the three regions) intercept the edges of the semiconductive body 61.

*Example V*

The device next described has all the advantages of the previous units, including stable shunt resistance values, low surface leakage currents, and low triggering voltages, but in addition includes more efficient utilization of the semiconductive wafer, and hence is the presently preferred embodiment.

The semiconductive bidirectional thryistor 80 (FIGURE 5) of this example comprises a given conductivity type semiconductive body or wafer 81 having two opposing major faces 82 and 83. The precise size, shape, and composition of semiconductive wafer 81 is not critical. In this example, semiconductive wafer 81 is disc-shaped, about 130 mils in diameter, about 8 to 10 mils thick, and consists of N conductivity type monocrystalline silicon having a resistivity of about 8 ohm-cm.

Two opposite conductivity type surface zones 84 and 85 (which are P type in this example) are formed in wafer 81 immediately adjacent wafer faces 82 and 83 respectively by diffusion of a conductivity modifier such as boron into the major wafer faces. The P type zones 84 and 85 are separated by a central zone 86, which consists of the original N type bulk of wafer 81. Advantageously, the concentration of the modifier is made greater in the legended portions 84' and 85' of zones 84 and 85 respectively by means of an additional diffusion step. For this reason, portions 84' and 85' of zones 84 and 85 have been legended P+ in the drawing, indicating heavy doping and high P type conductivity, while the remaining portions of these zones are labeled P, indicating lighter doping and lower P type conductivity in these remaining portions. Alternatively, P type zones 84 and 85 may be formed by epitaxial growth on an N type wafer. In either case, rectifying barriers 87 and 88 are formed at the boundaries between the central N type zone 86 and the P type surface zones 84 and 85 respectively.

Portions of major faces 82 and 83 are masked, and a conductivity modifier capable of inducing the original conductivity type of the wafer is diffused into the unmasked portions of zones 84 and 85 to form heavily doped low resistivity regions. In this example, since the original conductivity type of wafer 81 was N type, the conductivity modifier employed is a donor such as phosphorus pentoxide. The precise size and shape of the N+ diffused regions thus formed immediately adjacent wafer faces 82 and 83 is not critical, but preferably the diffused regions are formed in the low conductivity or P portion of each P type zone 84 and 85; and each of the diffused regions is asymmetric, that is may be described as having a large area end and a small area end, or as comprising a large portion or lobe and a small portion or lobe centrally joined.

One phosphorus-diffused $N^+$ type region thus formed in wafer face 83 is shown in the plan view of FIGURE 6*a*, and consists of a large area diffused region 89, which in this example is a semicircle on a diameter 110 mils long, and a small area diffused region 90, which in this example is a semicircle on a diameter of 50 mils. The two semicircles have the same center and their diameters the same straight line, but are on opposite sides of the line. Regions 89 and 90 are about 0.8 mil thick, and thus are thinner than P type zone 85, which is about 2 mils thick in this example.

The asymmetric phosphorus-diffused $N^+$ region formed in the wafer face 82 is shown in plan view in FIGURE 6*b*. The region consists of a large area portion 91 joined to a small area portion or region 92. However, the large area diffused region 91 in wafer face 82 lies over the small area diffused region 90 in wafer face 83, while the small area diffused region 92 in wafer face 82 lies over the large area diffused region 89 in wafer face 83. In this example, the large area diffused region 91 is also a semicircle on a diameter 110 mils long, while the small area region 92 is a semicircle on a 38 mil diameter. The two semicircles 91 and 92 have a common center, and lie on opposite sides of the same straight line. Region 91 differs from region 89 in that a small central portion 93 of region 91, which portion may conveniently be wedge-shaped as shown in FIGURE 6*b*, is masked during the phosphorus diffusion step that forms regions 91 and 92. When all the masks (not shown) are removed after the diffusion step, this central portion 93 remains as a $P^+$ enclave within the $N^+$ type region 91. Regions 91 and 92 are about 0.8 mil thick, and thus are thinner than P type zone 84, which is about two mils thick in this embodiment.

Preferably region 89 extends along wafer face 83 from beneath the outer periphery of region 84′ to beneath the inner periphery of region 91, and slightly overlaps the inner periphery of region 91. This slight overlap improves the sensitivity of the device to triggering pulses when operating in the third quadrant.

Standard masking and etching techniques are now used to form an annular moat 94 in the central portion of wafer face 82. Moat 94 is conveniently about 5 mils wide, about 0.9 mil deep, and has an inner diameter of about 30 mils, and an outer diameter of about 40 mils. Moat 94 thus runs around the periphery of diffused region 92, and around the periphery of portion 93 of the first P type zone 84. Moat 94 serves to isolate region 92 from region 91. The most 94 may advantageously be non-uniform in width, being wider in those portions of the moat where the moat crosses the boundary or junction between $N^+$ region 91 and $P^+$ region 84′ than in the remaining portions of the moat. The non-uniform moat 94 improves the sensitivity of the device in all trigerring modes by minimizing a useless portion of the shunt resistance.

A conductive metallic layer is deposited on selected portions of wafer face 82 to form two device electrodes. One electrode 95 is an annular ring which extends from the outer edge of moat 94 to the outer edge of wafer face 82. Electrode 95 serves as the first power electrode of the unit. A second metallic electrode covers the central portion of wafer face 82 within the area surrounded by moat 94. Electrode 96 serves as the gate electrode of the unit. FIGURE 6*c* is a plan view of the upper wafer face 82 after the cutting of moat 94, and after the deposition of the first power electrode 95 and the gate electrode 96.

A third electrode is formed by a metallic layer 97 which covers major wafer face 83. Electrode 97 serves as the second power electrode of the unit.

To complete the device, an electrical lead wire 27 is bonded to electrode 95, and serves as the first power lead. Another electrical lead wire 28 is bonded to electrode 96, and serves as the gate lead. The remaining steps of mounting the unit with electrode 97 down on a metallic header, and encapsulating and casing the device, are accomplished by standard methods of the art.

When the device of this embodiment is given a positive gate bias, the shunt resistance region which is effective in triggering the unit is that portion of P type zone 84 which is beneath the $N^+$ region 91. When the device is given a negative gate bias, the shunt resistance region which is effective in triggering the unit is the portion of P type zone 84 which is beneath $N^+$ region 92. Whereas in the device of Example I the two shunt resistance regions 29 and 29′ (FIGURE 1) are elecrtically in series, in the device of this embodiment the two shunt resistance reg'ons are electrically in parallel. Accordingly, the gate voltage required to trigger the device of this embodiment is descreased as compared to the device of Example I.

One important advantage of the device of this embodiment is that the gate current required for all triggering modes is more nearly constant, as well as lower than, the gate current required for comparable prior art devices. The four modes of operation of a bidirectional thyristor can be tabulated as follows:

| Mode | First Power Electrode Polarity | Second Power Electrode Polarity | Gate Electrode Polarity |
|---|---|---|---|
| I+ | − | + | + |
| I− | − | + | − |
| III+ | + | − | + |
| III− | + | − | − |

The I+ and I− modes are in the first quadrant (FIGURE 8), with their gate currents respectively positive and negative, while the III+ and III− modes are in the third quadrant, with the gate currents respectively positive and negative. In prior art units, the gate currents required for operation in the I− and II+ modes are considerably higher than the gate current required for operation in the I+ and III− modes. In contrast, in the device of this embodiment the triggering current required for operation in all four modes is nearly constant. Moreover, for a given size prior art silicon unit, the triggering current is about 100 milliamperes. In contrast, for a comparable size silicon device according to this embodiment, the triggering current is about 50 milliamperes, and some bidirectional thyristor units according to this embodiment exhibited triggering currents as low as 20 milliamperes. Furthermore, the triggering current required for devices according to this embodiment increases only slightly when the power handling capability of the device is increased by scaling up the size of the semiconductive wafer and its various regions and electrodes.

Another important advantage of devices according to this embodiment is their improved blocking capability, i.e., improved ability to withstand high voltages across the device power electrodes before breakover into the "ON" or conducting state. The blocking capability of both unidirectional and bidirectional thyristors depends in part on the thickness and material of the device blocking layer. Conventional bidirectional silicon thyristors of the prior art have exhibited breakover voltages of about 200 to 400 volts. In contrast, comparable silicon units according to this embodiment have exhibited the ability to block applied voltages as high as 500 to 600 volts before breakover into the conducting state. One reason for this improved blocking capabilty is that in the device of this embodiment, as in the previous examples, only three different conductivity type zones or regions intercept the wafer edges. As mentioned above, the surface leakage currents, i.e., the currents which flow at or near the wafer surface due to the injection of charge carriers from surface states, are reduced for the devices described in comparison to the surface currents which flow in the prior art devices, wherein, as illustrated in FIGURE 9, more than three different conductivity zones intercept the wafer edges. An additional reason for the improved blocking capability of the device of this example is that the triggering current of the device is fairly independent of the resistivity of the blocking layer 86, since the lateral current path through the blocking layer during triggering has been decreased.

Still another advantage of the device of this embodiment is that it is more efficient than the units previously described in respect to improved utilization of the emitter area, because the ratio of emitter area to emitter periphery is higher in the device of this embodiment. It is well known that, in order to obtain improved performance, the ratio of emitter area to emitter periphery should be low in a transistor. However, in a controlled rectifier this situation is reversed. The reason for this reversal of the desired ratio of emitter area to emitter periphery is that in a controlled rectifier the holes which cross the central blocking layer of the device will escape to one of the power electrodes if possible, rather than enter the N emitter regions. Hence, if a controlled rectifier or thyristor is made in which the ratio of emitter periphery to emitter area is high, as in transistors, it becomes easier for the holes which cross the blocking layer to avoid the N emitter regions. Thus improved efficiency is obtained in a controlled rectifier by making a unit in which the ratio of emitter area to emitter periphery is high.

But another advantage of the device of this embodiment is that it is more efficient than the devices of Examples II–IV in respect to utilization of the semiconductive wafer. The reason for this is that the device of this embodiment has only one gate contact, and hence leaves more of the surface area of the wafer available for the power electrodes.

Yet another advantage of the device of this embodiment is that the shunt resistance values are uniform from device to device and stable with respect to time. A high yield of bidirectional thyristors with controllably low gate current can be obtained in accordance with this embodiment because the shunt resistance region is "buried," as it were, and is not affected by the processing steps and ambients subsequent to the formation of the device junctions.

The shape of the asymmetric diffused regions in this embodiment can be varied as desired. If the semiconductive body utilized is square or rectangular in shape, the asymmetric region may for example consist of a large square adjoining a small square. Moreover, the asymmetric regions need not have a regular geometric shape, and may be irregular in shape.

The above examples are by way of illustration only, and not limitation. Other crystalline semiconductive materials such as indium phosphide and silicon carbide may be utilized, with appropriate acceptors and donors for each material. The conductivity types of the various regions shown may be reversed, so that the central blocking layer becomes P type instead of N type. Various other modifications may be made by those skilled in the art without departing from the spirit and scope of the invention as set forth in the specification and appended claims.

What is claimed is:

1. A bidirectional thyristor comprising a semiconductive body with two opposing major faces and an edge substantially perpendicular to said faces, said body having five successive regions of alternately different conductivity types, four p-n junctions between said five regions, and only three electrodes, characterized in that only two of said junctions intercept said edge of said body.

2. A semiconductor device having three electrodes only comprising:

a semiconductive body having first and second opposing major faces;

first and second zones of given conductivity type in said body immediately adjacent said first and second major faces respectively;

an opposite conductivity type zone in said body intermediate said first and second zones;

PN junctions between said opposite conductivity type zone and said first and second zones;

two regions of said opposite conductivity type in said first zone immediately adjacent said first major face;

PN junctions between said first zone and said two regions;

at least one region of said opposite conductivity type in said second zone immediately adjacent said second major face;

a p-n junction between said second zone and said one region;

a first electrode on said first major face, said first electrode being in direct contact with said first zone and with one of said two regions in said first zone;

a second electrode on said first major face, said second electrode being in direct contact with said first zone and with the other of said two regions in said first zone;

a third electrode on said second major face, said third electrode being in direct contact with said second zone and with at least one said opposite conductivity type region in said second zone;

said opposite conductivity type regions intercepting the surface of said body at said major faces only.

3. A semiconductor device having three electrodes only comprising:

a crystalline semiconductive body having first and second opposing major faces;

first and second zones of given conductivity type in said body immediately adjacent said first and second major faces respectively;

an opposite conductivity type zone in said body intermediate said first and second zones;

PN junctions between said opposite conductivity type zone and each of said first and second zones;

first and second regions of said opposite conductivity type in said first zone immediately adjacent said first major face, the thickness of said first and second regions being less than the thickness of said first zone;

PN junctions between said first zone and each of said first and second regions;

at least one region of said opposite conductivity type in said second zone immediately adjacent said second major face, the thickness of said region being less than the thickness of said second zone;

a PN junction between said second zone and each said region;

a first conductive electrode on said first major face, said first electrode being in direct contact with said first zone and with said first region in said first zone;

a second conductive electrode on said first major face, said second electrode being in direct contact with said first zone and with said second region in said first zone;

a third conductive electrode on said second major face, the third electrode being in direct contact with said second zone and with at least one said opposite conductivity type region in said second zone;

said opposite conductivity type regions intercepting the surface of said body at said major faces only.

4. A semiconductor device having three electrodes only comprising:

a crystalline semiconductive body having first and second opposing major faces;

first and second zones of given conductivity type in said body immediately adjacent said first and second major faces respectively;

an opposite conductivity type zone in said body intermediate said first and second zones;

PN junctions between said opposite conductivity type zone and each of said first and second zones;

a first annular region of said opposite conductivity type in said first zone immediately adjacent said first major face and close to the center thereof;

a PN junction between said first region and said first zone;

an annular moat in said first major face immediately adjacent the outer periphery of said first region;

a second annular region of said opposite conductivity type in said first zone immediately adjacent said first major face and around the outer periphery of said annular moat;

a PN junction between said second region and said first zone;

a third region of said opposite conductivity type in the central portion of said second zone immediately adjacent said second major face;

a PN junction between said third region and said second zone;

an annular fourth region of said opposite conductivity type in said second zone immediately adjacent said second major face and around the outer periphery of said third region;

a PN junction between said fourth region and said second zone;

a first conductive electrode on said first major face covering the portion thereof within the inner periphery of said moat, and being in direct contact with said first given type zone and with said first opposite type region in said zone;

a second conductive electrode on said first major face covering the portion thereof around the outer periphery of said moat, said second electrode being in direct contact with said first zone and with said second opposite type region in said first zone;

a third conductive electrode covering said second major face, said third electrode being in direct contact with said second zone and with said third and fourth opposite conductivity type regions in said second zone;

said four opposite conductivity type regions intercepting the surface of said body at said major faces only.

5. A semiconductor device having three electrodes only comprising:

a given conductivity type crystalline semiconductive body having first and second opposing major faces;

first and second zones of given conductivity type in said body immediately adjacent said first and second major faces respectively;

an opposite conductivity type zone in said body intermediate said first and second zones;

PN junctions between said opposite conductivity type zone and each of said first and second zones;

a first region of said opposite conductivity type in the central portion of said first zone immediately adjacent said first major face;

a PN junction between said first region and said first zone;

a first annular moat in said first zone around the outer periphery of said first region;

an annular second region of said opposite conductivity type in said first zone immediately adjacent said first major face and around the outer periphery of said first moat but spaced therefrom;

a PN junction between said second region and said first zone;

a second annular moat in said first zone around the outer periphery of said second region;

an annular third region of said opposite conductivity type in said second zone immediately adjacent said second major face and close to the center thereof;

a PN junction between said third region and said second zone;

an annular fourth region of said opposite conductivity type in said second zone immediately adjacent said first major face and around the outer periphery of said third region but spaced therefrom;

a PN junction between said fourth region and said second zone;

a first conductive electrode on said first major face covering the portion thereof within the inner periphery of said first moat, and being in direct contact with said first region in said first zone;

a second conductive electrode on said first major face covering the portion thereof between the outer periphery of said first moat and the inner periphery of said second moat, said second electrode being in direct contact with said first zone and with said second region in said first zone;

a third conductive electrode on said first major face, covering a portion thereof between the outer periphery of said second moat and the periphery of said body;

a first electrical lead wire attached to said first and third electrodes;

a second electrical lead wire attached to said second electrode;

a fourth conductive electrode covering said second major face, said fourth electrode being in direct contact with said second zone and with said third and fourth opposite conductivity type regions in said second zone;

said four opposite conductivity type regions intercepting the surface of said body at said major faces only.

6. A semiconductor device having three electrodes only comprising:

a crystalline semiconductive body having first and second opposing major faces;

first and second zones of given conductivity type in said body immediately adjacent said first and second major faces respectively;

an opposite conductivity type zone in said body intermediate said first and second zones;

PN junctions between said opposite conductivity type zone and each of said first and second zones;

an annular first region of said opposite conductivity type in said first zone immediately adjacent said first major face;

a PN junction between said first region and said first zone;

a first annular moat in said first face around the inner periphery of said first region;

an annular second region of said opposite conductivity type in said first zone immediately adjacent said first major face and around the outer periphery of said first region but spaced therefrom;

a PN junction between said second region and said first zone;

a second annular moat in said first face around and immediately adjacent the inner periphery of said second region;

a third region of said opposite conductivity type in the central portion of said second zone immediately adjacent said second major face;

a PN junction between said third region and said second zone;

an annular fourth region of said opposite conductivity type in said second zone immediately adjacent said second major face and around the periphery of said third region but spaced therefrom;

a PN junction between said fourth region and said second zone;

a first conductive electrode on said first major face covering the portion thereof within the inner periphery of said first moat, said first electrode being in direct contact with said first zone;

a second conductive electrode on said first major face covering the portion thereof between the outer periphery of said first moat and the inner periphery of said second moat, said second electrode being in direct contact with said first zone and with said first region in said first zone;

a third conductive electrode on said first major face covering a portion thereof around the outer periphery of said second moat, said third electrode being in direct contact with said second region in said first zone;

a first electrical lead wire attached to said first and third electrodes;

a second electrical lead wire attached to said second electrode;

a fourth conductive electrode covering said second major face, said fourth electrode being in direct contact with said second zone and with said third and fourth opposite conductivity type regions in said second zone;

said four opposite conductivity type regions intercepting the surface of said body at said major faces only.

7. A semiconductor device having three electrodes only comprising:

a crystalline semiconductive body having first and second opposing major faces;

first and second zones of given conductivity type in said body immediately adjacent said first and second major faces respectively;

an opposite conductivity type zone in said body intermediate said first and second zones;

PN junctions between said opposite conductivity type zone and each of said first and second zones;

a first region of said opposite conductivity type in said first zone immediately adjacent said first major face;

a PN junction between said first region and said first zone;

a second region of said opposite conductivity type in said first zone, said second region being smaller than said first region and spaced therefrom by a portion of said first zone;

a PN junction between said second region and said first zone;

an annular moat in said first major face around the periphery of said second region and said portion of said first zone;

an asymmetric third region of said opposite conductivity type in said second zone immediately adjacent said second major face;

a PN junction between said third region and said second zone;

a first conductive electrode on said first major face covering the portion thereof outside the periphery of said moat;

a second conductive electrode on said first major face covering the portion thereof inside the periphery of said moat; and a third conductive electrode covering said second major face.

8. A semiconductor device having three electrodes only as in claim 7, wherein said opposite conductivity type regions in said first and second zones intercept the surface of said body at said major faces only.

9. A semiconductor device having three electrodes only comprising:

a disc-shaped monocrystalline silicon body having first and second opposing major faces;

first and second zones of P conductivity type in said body immediately adjacent said first and second major faces respectively;

an N conductivity type zone in said body intermediate said first and second P type zones;

PN junctions between said N conductivity type zone and said first and second zones;

a first N conductivity type region in said first zone immediately adjacent said first major face;

a PN junction between said first N conductivity type region and said first zone;

a second N conductivity type region in said first zone immediately adjacent said first major face, said second N type region being smaller than said first region and spaced therefrom by a portion of said first P type zone;

a PN junction between said second N conductivity type region and said first zone;

an annular moat in said first major face around the periphery of said second N type region and said portion of said first P type zone, the depth of said moat being less than the thickness of said first zone;

an asymmetric third N type region in said second zone immediately adjacent said second major face, said third N type region having a large end and a small end;

a PN junction between said third N conductivity type region and said second zone;

a first metallic electrode on said first major face covering the portion thereof outside the periphery of said moat;

a second metallic electrode on said first major face covering the portion thereof inside the periphery of said moat;

a third metallic electrode covering said second major face;

said three N type regions intercepting the surface of said body at said major faces only.

10. A semiconductor device having three electrodes only as in claim 9, wherein the width of said moat is nonuniform and greater in those portions where said moat crosses a p–n junction than in the remaining portions of said moat.

References Cited

UNITED STATES PATENTS

| | | | |
|---|---|---|---|
| 2,993,154 | 7/1961 | Goldey et al. | 317—235 |
| 3,123,750 | 3/1964 | Hutson et al. | 317—235 |
| 3,196,330 | 7/1965 | Moyson | 317—235 |
| 3,275,909 | 9/1966 | Gutzwiller | 317—235 |
| 3,284,639 | 11/1966 | Giuliano et al. | 307—88.5 |

JOHN W. HUCKERT, *Primary Examiner.*

R. F. SANDLER, *Assistant Examiner.*